United States Patent Office 3,517,521
Patented June 30, 1970

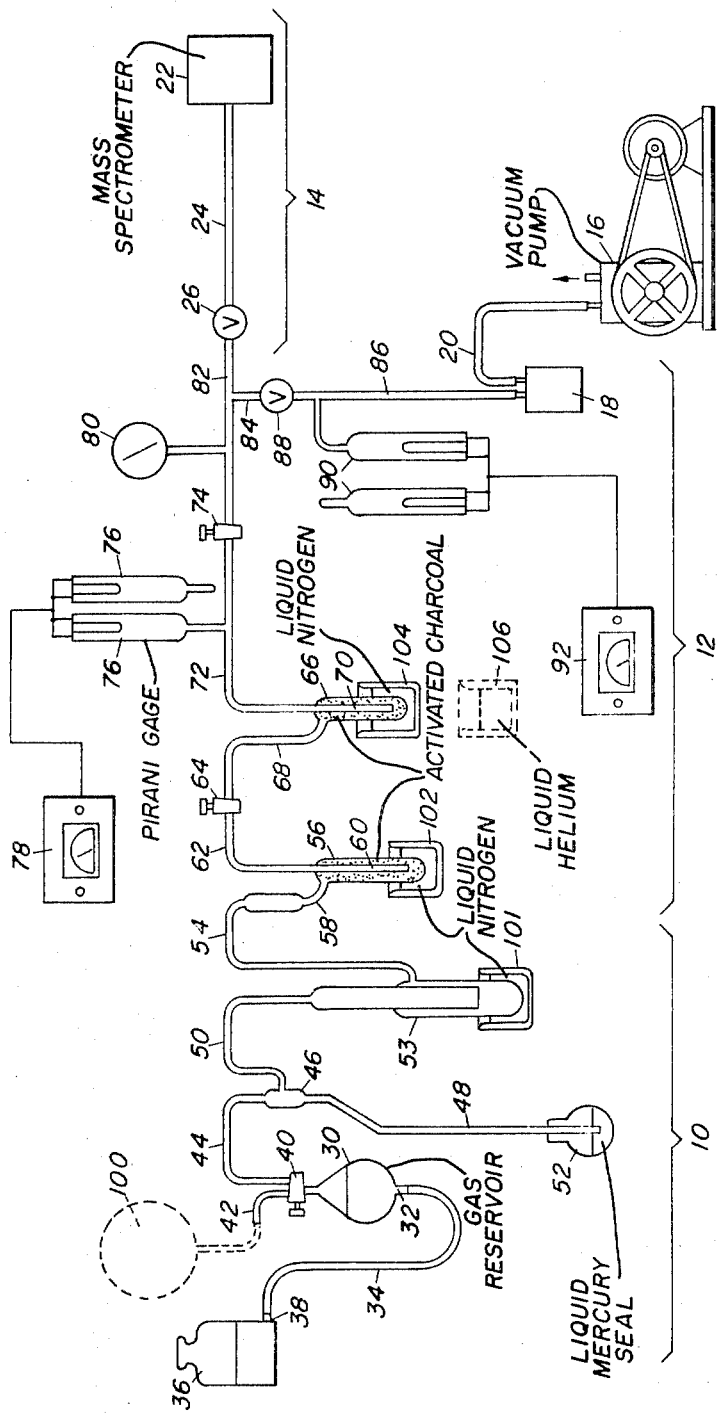

3,517,521
METHOD AND APPARATUS FOR SEPARATING NEON FROM A MIXTURE OF GASES
David E. Emerson, Amarillo, Tex., assignor to the United States of America as represented by the Secretary of the Interior
Filed Jan. 24, 1968, Ser. No. 700,285
Int. Cl. F25j 3/08
U.S. Cl. 62—12                                        6 Claims

ABSTRACT OF THE DISCLOSURE

Method and apparatus for separating neon from a mixture of gases effectuated under a partial vacuum by initially freezing-out with adsorption in an activated charcoal cold trap cooled by liquid nitrogen, all contaminants of the gaseous mixture to obtain a mixture of helium and neon gases, followed by freezing-out with adsorption in a second activated charcoal cold trap cooled by liquid helium, the neon of said mixture while evacuating the helium of the mixture, and subsequently evolving neon separately by heating the activated charcoal in the second cold trap.

---

The invention resulted from work by the Bureau of Mines of the U.S. Department of the Interior, and the domestic title to the invention is in the Government.

This invention relates to improvements in gas separation apparatus and procedures, and facilitating analysis of the isotopic constituents of gas. The invention has particular application to obtaining neon from natural gas or air, or neon and helium from the atmosphere, and accurate analyses of the isotopic abundances and the determinations of percentages of these gases in respect to other gases with which they are present.

Separation procedures heretofore used in this connection required the concentration of neon by passing Grade-A helium containing a few p.p.m. neon, obtained from natural gases, through a trap cooled with liquid helium (4.2° K.), as described in an article by the incentor entitled "The Isotopic Abundance of Neon from Helium Bearing Natural Gases," published in Geochimica et Cosmochimica Acta, vol. 30, No. 9, Pergamon Press, 1966, pages 847 to 854. A similar freeze-out procedure described in Pat. No. 3,194,054, issued July 13, 1965, to Deaton et al., also concentrates neon among trace impurities in a sample of Grade-A helium for separating them from the sample by freezing these impurities out of the sample in a trap cooled by liquid helium. However, in each instance noted the concentrations obtained are in a solid form which when regasified provide neon together with other impurities which contaminate the neon. Furthermore, only high-helium content natural gases, the source for Grade-A helium, are advantageously utilized in the aforesaid prior art procedures.

Basic to the invention disclosed herein is the action of activated coconut charcoal maintained at a liquid nitrogen temperature (77° K.) to adsorb all gases in a mixture except helium and neon. Thus, the invention employs in sequence, a dropout trap cooled in liquid nitrogen to remove water, carbon dioxide and some hydrocarbons, followed by a first charcoal trap cooled in liquid nitrogen to obtain a gas stream containing a mixture of helium and neon, and a second charcoal trap cooled to 30° K. and made the recipient of this gas stream, wherefore the helium continues its flow by way of the second trap while the neon in the stream concentrates in this trap. When neon is accumulated in a quantity desired, the temperature of the containing trap is raised to that of liquid nitrogen to evolve neon gas from the charcoal, and subsequently raised to —110° F. to provide additional neon gas. Preliminarily, a suitable gas feed for this neon separation can be produced by separating helium and neon directly from air by cooling both charcoal tubes with liquid nitrogen, and passing air through an apparatus wherein helium and neon can be collected under the conditions previously noted. In this regard, activated charcoal in traps cooled in liquid nitrogen have heretofore found utility in attempts to determine the oxygen and nitrogen content of a helium stream. However, an article entitled "Determination of Impurities in Helium by Gas Chromatography," by Mosen and Buzzelli, published in Analytical Chemistry, vol. 32, No. 1, January 1960, pages 141, 142, indicated that such cold traps do not hold neon well enough to permit its quantitative measurement. The contrary teaching of this prior art notwithstanding, there is made available by the present invention an arrangement operable under conditions whereby activated charcoal traps are enabled to isolate neon in helium, and subsequently concentrate neon as a product permitting its quantitative analysis.

It is therefore a primary object of the present invention to provide a method for separating neon from a gas mixture.

A further important objective of the present invention is to provide an improved cold trap apparatus for separating neon from a gas mixture.

The manner in which these and other objects of the invention are attained will become clear from the detailed description which follows and the figure of the drawing schematically illustrating one form of the improved apparatus wherewith the method of the invention can be accomplished.

Reference is now made to the figure of the drawing where the apparatus is shown as a generally in-line structure including a gas feed control arrangement 10, operable to make accessible an input of gas for processing in a concentrator-separator arrangement 12, which in turn furnishes a product gas made available for study in an analyzer arrangement 14. Operatively interrelating the several components of these arrangements to function as hereinafter explained, are pressure reduction devices including a fore pump 16 exhausting a diffusion pump 18 by way of a hose connection 20. A mass spectrometer 22 of arrangement 14 is adapted to receive product gas for analysis by way of a conduit 24, wherein a cut-off valve 26 is operable in a conventional manner. A flask-like container 30, at the hub of feed control arrangement 10, has a drain pipe 32 to which is attached a flexible hose 34 extending to a reservoir receptacle 36, as it is fitted on a pipe 38 extending from the receptacle adjacent its base. Tightly sealed in a necked-in upper opening of container 30 is a stopcock device 40 wherein a valve stem is adjustably rotatable to selectively complete for varying capacities a passage into container 30 from a separate conduit connection 42, while blocking a passage to a further conduit connection 44, or to complete a similar passage out of container 30 and into conduit connection 44, while blocking the passage to conduit connection 42. An expanded bulb-like conduit junction 46 has openings therein which receive as integral parts thereof, extremities of conduit connection 44, and further conduits 48 and 50. Conduit 48 extends down from junction 46 and into a vessel 52 containing sufficient mercury to maintain a column of mercury in the conduit which provides a safety relief for the pressure system to be hereinafter more fully explained.

Conduit 50 extends from junction 46 so as to constitute a passage into tubular neck of a cold trap 53, wherefrom an outlet conduit 54 leads to a tube of a charcoal trap 56 by way of a sealed connection at an inlet pipe 58 of the tube. Trap 56 is equipped with a collector pipe 60 which extends down through activated charcoal filling a substantial portion of the trap tube, and forms a seal at the top thereof from which the pipe extends as a further connective conduit 62. A stopcock 64 within an intermediate part of conduit 62 is operable thereat to control gas flow in a passage defined by this conduit which effects a connection between charcoal trap 56 and a second charcoal trap 66 by way of a sealed inlet pipe 68 of the tube of this trap. A collector pipe 70 extending through activated charcoal substantially filling the tube of trap 66, exits therefrom by way of sealed connection at the top thereof and joins a further passage in a conduit 72, also containing a conventional stopcock 74. At a point in conduit 72, ahead of stopcock 74, is a connection thereto from a Pirani gage 76 having electrical connections to a read-out meter 78. A connection to conduit 72 at a point immediately following stopcock 74, operatively associates a sensitive pressure gage 80 with the conduit. A T connection couples the end of conduit 72 to a conduit 82 extending therefrom to constitute a feeder line to valve 26 controlling flow in line 24 to mass spectrometer 22, and a conduit 84 which operatively associates the aforesaid feed control and concentrator-separator arrangements with pressure reduction devices 16 and 18. A valve mechanism 88 is arranged by conventional connections to control gas flow between conduit 84 and a conduit 86 fitted on a pipe stem protruding from diffusion pump 18. Located at a point in conduit 86, following its connection to valve 88, is a connection from a further Pirani gage 90 having the usual electrical connections to a data read-out meter 92.

Although, as hereinbefore explained, activated coconut charcoal maintained at 77° K. temperature of liquid nitrogen will remove or adsorb all gases in a mixture of gases, except the helium and neon thereof, this charcoal will initially adsorb a small amount of neon. That, for the purposes of the present invention, it is necessary to saturate with neon the low temperature activated charcoal in the cold trap to which the mixture is introduced in a first major step of the method as disclosed herein. Thereafter, a mixture of helium and neon which was separated from the other gases in the first charcoal cold trap is caused to slowly flow through additional activated charcoal maintained at approximately 30° K. in a further cold trap. Helium, which remains gaseous at this temperature will flow through the further trap, whereas the neon of this mixture is concentrated in the charcoal. Evacuation of the apparatus following a predetermined flow of the mixture, and a subsequent isolation of the concentrated neon in the cold trap, permits the evolving of neon gas from the charcoal when the cold trap temperature is raised to the temperature of liquid nitrogen (−320° F.), and pumped off to approximately $1 \times 10^{-2}$ mm. Hg pressure. Examination of this sample of neon in the mass spectrometer for its isotopic abundance is thus facilitated. Raising the temperature of the cold trap to −110° F. by surrounding it with Dry Ice and methanol allows further samples of neon gas to be evolved for examination and analysis.

In proceeding with the method according to a preferred form of the invention the activated charcoal in cold traps 56 and 66 is conditioned as follows:

(1) With valve 26 set closed to cut off flow to conduit 24, and stopcock 40 turned to isolate feed control arrangement 10 from separator-concentrator arrangement 12, the system is initially set to evacuate condition by operation of pumps 16 and 18 with valve 88 open, and stopcocks 64 and 74 adjusted to maintain the passages to the cold traps of the separator-concentrator arrangement open to the pumps. Pirani gages 76 and 90 are also turned on.

(2) When meters 78 and 92 of the Pirani gages indicate that a good vacuum is achieved, heat is applied by an electric heat gun, or the like, to the cold traps 56 and 66, to bake out the charcoal therein. A temperature of 400° F. for approximately 15 minutes is usually sufficient. Heating the charcoal in this manner rids it of adsorbed nitrogen, oxygen, argon, remaining traces of water, carbon dioxide and hydrocarbons, and small amounts of neon and helium and other minor constituents of gas previously processed therethrough. After cold traps 56 and 66 are allowed to cool to near room temperature, the Pirani gages are checked, and reset if necessary by closing valve 88, and as required stopcock 74, for a minute or so, then opening them to effect a leak test. If the vacuum is good, the Piranis can be set to zero.

(3) Reservoir receptacle 36, containing a supply of distilled water, is made operable to fill container 30 when stopcock 40 is turned to communicate container 30 to atmosphere. Receptacle 36 is raised above the container until water fills conduit connection 42.

(4) A cylinder 100 storing the gas sample input for the apparatus is coupled to conduit connection 42, with rubber tubing or the like, and valves on the cylinder are adjusted to allow a flow of sample gas through stopcock 40 and into container 30. A volume of the sample gas sufficient to fill container 30 is admitted, and the container is then purged by raising receptacle 36 sufficiently to force the sample back through conduit connection 42. Appropriate adjustment of receptacle 36 is thereafter made to allow container 30 to obtain a full volume of the sample gas from cylinder 100.

(5) Stopcock 40 is readjusted to communicate container 30 with conduit connection 44. Since stopcocks 64 and 74, and valve 88 are open, continuing operation of pumps 16 and 18 draws the sample gas through the system whereby the system passages are purged to the extent where Pirani gage 90 obtains a reading on meter 92 of 0.2 mm. Hg pressure.

(6) Dewar flask enclosures 101, 102, and 104, containing liquid nitrogen, are then placed to surround cold trap 53, and charcoal traps 56 and 66, respectively, and lower their temperature to 77° K. Cold trap 53 at this low temperature remains effective throughout the operation to remove water, carbon dioxide and small amounts of hydrocarbons from the sample gas.

(7) After approximately 500 cc. of sample gas is passed through the apparatus, enclosure 104 is removed and immediately replaced with a Dewar flask enclosure 106, shown in the figure by dashed lines, containing liquid helium vapor which surrounds cold trap 66. The liquid helium level is adjusted until it is about 2 inches below the bottom of the tube of cold trap 66, bringing this trap to a temperature of approximately 30° K. Usually 3 inches of liquid helium in a one-liter Dewar is sufficient for a single sampling procedure or analysis.

(8) Dewar flask enclosure 102, surrounding cold trap 56 can normally be set to extend about one inch above the tube of this cold trap.

Having conditioned the apparatus as set forth above, the neon can be concentrated as follows:

(1) Stopcock 40 is adjusted to provide a continuing flow therethrough from container 30 to the apparatus so that a reading of about 10.0 mm. Hg is indicated on gage 80. Modification of the level of liquid surrounding cold trap 66 with respect to the tube thereof, enables maintaining the desired pressure, whereby raising the liquid helium level lowers a pressure, and a lowering of the liquid helium level is effectuated when the pressure approaches zero.

(2) As container 30 is exhausted of the sample therein, refilling of the container is undertaken following the procedure previously outlined in steps 3 and 4 for conditioning the apparatus.

(3) Steps 1 and 2 can therefore be repeated to obtain in cold trap 66 the desired volume of concentrated sample.

(4) Gas, typically containing 15 p.p.m. of neon in high purity helium, is supplied in the amount of about 12 liters to provide a sufficient amount for concentration in cold trap 66, whereafter stopcocks 40 and 64 are turned to close their passages in the apparatus.

(5) The level of liquid helium in Dewar enclosure 106 is then gradually lowered an additional two inches so that any adsorbed helium is pumped off. Since, as hereinbefore indicated, lowering the liquid helium level permits an increase in pressure readable on gage 80, the pressure should be regulated by raising the helium level as necessary to keep gage 80 reading about 25 mm. Hg pressure.

(6) After the pressure subsides to about 1 mm., as indicated on gage 80, the liquid helium in Dewar enclosure 106 is removed from cold trap 66, and this trap is quickly immersed in liquid nitrogen such as in enclosure 104.

(7) Gage 80 is noted to avoid the build-up of excessive pressure while valve 88 is kept open until a pressure of 10 microns read on meter 92 is detected by Pirani gage 90.

(8) Neon evolved from cold trap 66 can be accumulated to a pressure of 10 microns or more, and be admitted to mass spectrometer inlet volume through valve 26. However, an elapsed time of 5 to 10 minutes may be needed before full pressure of neon is built up by desorption from the charcoal. As the pressure build-up appears to be maximum, the sample can be analyzed for neon isotope ratios, as well as for other possible constituent components.

The apparatus can be used to separate helium and neon directly from air by surrounding cold traps 56 and 66 with liquid nitrogen and passing air through the apparatus. Helium and neon will collect in the sample inlet system of the mass spectrometer. With vacuum valve 88 closed, and sufficient pressure of the gas mixture collected, the isotopic ratios of neon and helium can be determined, as previously described.

An exemplary embodiment of the present invention using 13 grams of activated coconut charcoal in trap 56, and 8 grams of the charcoal in trap 66, effectively processed 4 liters of atmospheric air at the rate of one-third of a liter per minute. Larger production schemes could be based on this approximate ratio for purification, as well as include facilities for conditioning the charcoal in one arrangement of traps while gas flow is switched for processing in another arrangement of charcoal traps. Collecting and storing the gases produced could be facilitated by following the charcoal trap outlet with a diaphragm-type noncontaminating compressor operating to compress these gases to any desired pressure in a suitable gas-tight container, such as used to store helium.

While a preferred embodiment and procedure for the invention has been described and illustrated, it is to be understood that the invention is not limited thereby but is susceptible to changes in form and detail.

What is claimed is:

1. A method for separating neon from a flowing sample of a gaseous substance comprising the steps of passing said sample through a confined quantity of activated charcoal maintained at a pressure of a partial vacuum and temperature of liquid nitrogen whereby only a mixture of helium and neon of said gaseous substance flows through and out of said charcoal leaving other constituents of said gaseous substance solidified and concentrated with said charcoal by their adsorption thereon, passing said helium and neon mixture through a further confined quantity of activated charcoal maintained at said partial vacuum and a temperature substantially near to that of liquid helium whereby only said helium of said mixture flows through and out of said further charcoal and leaving said neon adsorbed by said further charcoal, stopping the flow of said sample, and heating said further charcoal whereby gaseous neon is evolved.

2. The separation method of claim 1 wherein gaseous neon is evolved by heating said further charcoal to the temperature of liquid nitrogen at a pressure of a partial vacuum of approximately $1 \times 10^{-2}$ mm. of Hg.

3. The separation method of claim 1 wherein said sample of gaseous substance is ambient air.

4. The separation method of claim 1 wherein immediately prior to flowing said sample of a gaseous substance for said separation of neon, said confined quantity and further confined quantity of activated charcoal are conditioned by obtaining thereon said pressure of a partial vacuum, heating said confined quantities of charcoal to 400° F. for approximately 15 minutes, purging said confined quantities of extraneous gaseous substances entrained therein by traversing said confined quantities with a flow of said sample gaseous substance, and cooling said confined quantities to the temperature of liquid nitrogen.

5. Apparatus for separating neon gas from a mixture of gases including helium, comprising control means adapted to supply a predetermined quantity of said mixture of gases, a freeze-out means including first and second cold-traps, a third cold-trap constituting a further freeze-out means, gas flow conduits interconnecting said supply means and the cold-traps of said freeze-out means, and the latter to the cold trap of said further freeze-out means, said freeze-out means being operable to separate from said mixture of gases substances contaminating a constituent gaseous mixture of helium and neon, said further freeze-out means being operable to separate from said constituent gaseous mixture said neon thereof, a liquid mercury seal in the conduit preceding said freeze out means flow cut-off means in said conduits being operable to isolate said further freeze-out means from said freeze-out means, and evacuating means operable to draw said mixture of gases through said freeze-out means and further freeze-out means, and when said cut-off means is operated to isolate said further freeze-out means, to draw helium gas therefrom whereby depletion of said helium from said further freeze-out means obtains separated neon retained in said further freeze-out means.

6. Apparatus of claim 5 wherein said second and third cold traps comprise tubes containing activated charcoal, and said first, second and third cold traps are initially maintained at the temperature of liquid nitrogen, and when said cut-off is operated to isolate said further freeze-out means said third cold trap is maintained at approximately the temperature of liquid helium.

References Cited

UNITED STATES PATENTS

| 1,906,917 | 5/1933 | Peters | 55—66 |
| 3,194,054 | 7/1965 | Deaton | 62—12 |
| 3,340,699 | 9/1967 | Post | 62—41 |

FOREIGN PATENTS

| 143,020 | 3/1961 | U.S.S.R. |
| 148,022 | 12/1962 | U.S.S.R. |

NORMAN YUDKOFF, Primary Examiner

A. F. PURCELL, Assistant Examiner

U.S. Cl. X.R.

55—66, 74, 82; 62—18, 22, 42